United States Patent [19]

Havens et al.

[11] Patent Number: 5,729,381
[45] Date of Patent: Mar. 17, 1998

[54] GLASSES FOR LASER PROTECTION

[75] Inventors: Thomas G. Havens, Painted Post; David J. Kerko, Corning; JoAnn Morrell, Horseheads, all of N.Y.

[73] Assignee: Corning Incorporated, Corning, N.Y.

[21] Appl. No.: 555,652

[22] Filed: Nov. 13, 1995

Related U.S. Application Data

[62] Division of Ser. No. 334,932, Nov. 7, 1994, Pat. No. 5,540,745.

[51] Int. Cl.$^6$ .................................................. G02B 1/08
[52] U.S. Cl. .......................... 359/361; 359/355; 359/350; 501/32; 501/65; 501/66; 501/67; 501/69; 501/77; 428/212; 428/426
[58] Field of Search ............................. 501/32, 65, 66, 501/67, 69, 77; 428/212, 426; 359/355, 350, 361

[56] References Cited

U.S. PATENT DOCUMENTS

| | | | |
|---|---|---|---|
| 4,155,735 | 5/1979 | Ernsberger | 65/30 E |
| 4,240,836 | 12/1980 | Borrelli et al. | 106/47 Q |
| 4,253,861 | 3/1981 | Graft et al. | 65/30 E |
| 4,979,976 | 12/1990 | Havens et al. | 65/30.11 |
| 5,281,562 | 1/1994 | Araujo et al. | 501/32 |
| 5,322,819 | 6/1994 | Araujo et al. | 502/65 |
| 5,430,573 | 7/1995 | Araujo et al. | 359/361 |
| 5,625,427 | 4/1997 | Araujo et al. | 351/159 |

*Primary Examiner*—Archene Turner
*Attorney, Agent, or Firm*—Milton M. Peterson

[57] ABSTRACT

This invention is directed to the production of cuprous halide- or a cuprous-cadmium halide-containing glass articles which are essentially completely opaque to ultraviolet radiation and can be essentially completely opaque to radiation within the region of wavelengths of up to 550 nm, but are transparent to visible radiations having a wavelength longer than the radiation within the region of opacity. The method involves exposing the glass articles to a hydrogen gas-containing atmosphere at a temperature between about 375°–500° C. for a period of at least 18 hours to develop an integral reduced layer in at least one surface of the article having a depth effective to prevent the transmission of ultraviolet radiation and radiation having a wavelength up to 550 nm through the article.

7 Claims, 3 Drawing Sheets

GLASSES FOR LASER PROTECTION

This is a division of application Ser. No. 08/334,932, filed Nov. 7, 1994, now U.S. Pat No. 5,340,745.

RELATED APPLICATION

U.S. application Ser. No. 08/562,951 filed Apr. 27, 1995, now U.S. Pat. No. 5,627,119 and assigned to the same assignee as the present application by T. G. Havens, D. J. Kerko, and JoAnn Morrell, under the title LASER EYEWEAR PROTECTION, is directed to the production of glass articles which are transparent to visible radiation, but are essentially opaque to ultraviolet radiation and, where desired, to radiation having wavelengths up to 550 nm, i.e., radiation in the blue region of the spectrum. The method comprises subjecting silver halide-containing glass articles to flowing hydrogen gas at temperatures between 375°–500° C. for a period of time sufficient to produce an integral reduced surface layer on at least one surface of the glass articles, the combined depth of that surface layer being sufficient to effectively block the passage of radiation therethrough. The resulting glasses provide excellent protection to exposure of laser radiation in the above region of the spectrum.

BACKGROUND OF THE INVENTION

U.S. Pat. No. 5,281,562 (Araujo et al.) is directed to the production of non-photochromic glasses containing a cuprous halide or a cuprous-cadmium halide crystal phase which exhibit a sharp spectral cutoff at a wavelength of about 400 nm, those glasses having base compositions consisting essentially, expressed in terms of cation percent on the oxide basis, of 35–73% $SiO_2$, 15–45% $B_2O_3$, 0–12% $Al_2O_3$, the $Al_2O_3$ being less than 10% when $SiO_2$ is greater than 55%, 0–12% $Li_2O$, 0–20% $Na_2O$, 0–12% $K_2O$, 4.75–20% $Li_2O+Na_2O+K_2O$, 0–5% CaO and/or SrO and/or BaO, 0.125–1.0% $Cu_2O$, 0–1% CdO, 0–5% $ZrO_2$, 0–0.75% $SnO_2$, and 0–1% $As_2O_3$ and/or $Sb_2O_3$, and containing, expressed in terms of weight percent, 0–1.75% Cl, 0–1.0% Br, 0.25–2.0% Cl+Br, and 0–2% F, said glass having an R-value, calculated in terms of mole percent, of 0.15–0.45, the R-value not exceeding 0.30 except as the glass composition meets at least one condition selected from the group consisting of up to 12 cation % $Li_2O$, less than 10 cation % $Al_2O_3$, at least 0.3 cation % $Cu_2O$, and 0.5–2.0 weight % Cl+Br.

The R-value is noted in the patent as constituting a measure of the basicity of a glass and as being defined by the formula $$R = \frac{M_2O + 2MO - Al_2O_3 - ZrO_2}{B_2O_3}$$

wherein $M_2O$ represents alkali metal oxides and RO represents alkaline earth metal oxides.

Those glasses are transparent in the visible region of the radiation spectrum, but are essentially opaque to ultraviolet radiation; i.e., those glasses essentially completely block radiation in that region of the electromagnetic spectrum having wavelengths of 400 nm and shorter. Accordingly, those glasses can be utilized in laser shield applications involving radiation in the ultraviolet region of the spectrum. As utilized herein, the expressions "essentially completely" and "essentially opaque" mean that, whereas it is most preferred that all of the ultraviolet radiation will be blocked, it is possible that a small amount will be passed, but that amount is so small as to have a negligible effect upon the use of the glasses for laser protection.

U.S. Pat. No. 5,281,562 is expressly incorporated herein by reference.

Whereas the above-described glasses exhibit very effective spectral cutoffs of radiation having wavelengths of 400 nm and shorter, they were found to be unacceptable, however, when subjected to laser radiation having wavelengths between 400–550 nm.

Therefore, the principal objective of the present invention was to provide glass articles transparent in the visible region of the electromagnetic spectrum, but essentially opaque to radiation in the ultraviolet region of the spectrum and up to radiation having a wavelength of 550 nm.

A complementary objective was to devise a method for preparing such glass articles.

A specific objective was to devise glass compositions to be used in lenses to protect the eyeglass wearer from eye damage upon exposure to laser radiation.

SUMMARY OF THE INVENTION

As was observed above, glass articles prepared from compositions disclosed in U.S. Pat. No. 5,281,562 are transparent to visible radiation and essentially completely opaque to ultraviolet radiation. We have found that those glass articles can be made absorbing of radiation in a controlled manner up to a wavelength of 550 nm by subjecting those articles to a hydrogen-containing atmosphere at temperatures within the range of 375°–500° C. for a period of time sufficient to develop a reduced surface layer therein having a depth effective to block the transmission of radiation therethrough having wavelengths between about 400–550 nm.

GENERAL DESCRIPTION OF THE INVENTION

In general terms, the inventive products comprise cuprous halide- or a cuprous-cadmium halide-containing glass articles which are essentially completely opaque to ultraviolet radiation and can be essentially completely opaque to radiation within the region of wavelengths up to 550 nm, but are transparent to visible radiation having a wavelength longer than the radiation within the region of opacity, said articles having at least one surface having an integral reduced layer therein, the depth of that layer being effective to prevent transmission therethrough of radiation having a wavelength up to 550 nm.

When also viewed in general terms, the inventive method comprises exposing a cuprous halide- or a cuprous-cadmium halide-containing glass article to a hydrogen gas-containing atmosphere in a heat treating chamber operating at a temperature between about 375°–450° C. for a period of at least 18 hours to develop an integral reduced layer in at least one surface of the article having a depth effective to prevent the transmission of ultraviolet radiation and radiation having a wavelength up to 550 nm through the article. Customarily, the glass article will be so configured that it will have a front surface and a back surface and both surfaces of the article will be subjected simultaneously to flowing hydrogen gas. In this way an integral reduced layer will be developed in both surfaces and the heat treatment in the flowing stream of hydrogen gas will be continued for a sufficient length of time such that the combined depth of the two layers will be effective to prevent the transmission of radiation having a wavelength up to 550° C. through the glass article.

Through control of time and temperature parameters, the generation of integral surface layers of precise thicknesses is possible. The development of the layers takes place more rapidly at higher temperatures, but close control of the depth of the layer is more difficult. Accordingly, although from an economic standpoint the use of short firing times at temperatures in the vicinity of 450° C. would be desirable, where careful control is required to achieve essentially complete opacity up to a specific radiation wavelength, longer firing periods, e.g., 24–48 hours, at temperatures between about 400°–450° C. are preferred.

Whereas the composition intervals disclosed in U.S. Pat. No. 5,281,562 above comprise the preferred glasses, it is only necessary that the glass contain a cuprous halide and/or a cuprous-cadmium halide to be operable. That is, we believe a chemical reduction of copper occurs in contact with the cuprous halide and/or cuprous-cadmium halide crystals.

It will be appreciated that, where desired, conventional glass colorants may be included in the base glass composition to impart a tint to the glass.

BRIEF DESCRIPTION OF THE DRAWINGS

FIGS. 1–8 comprise graphs plotting transmittance vs. radiation wavelength. The abscissa records wavelengths in terms of nm and the ordinate records transmittances in terms of percent.

PRIOR ART

U.S. Pat. No. 4,240,836 (Borrelli et al.) and U.S. Pat. No. 4,979,976 (Havens et al.) disclose the heat treatment of silver halide-containing glass articles in a hydrogen-containing atmosphere to develop specific visible light absorption characteristics in the glass articles. Cuprous halide- and/or cuprous-cadmium halide-containing glasses are nowhere mentioned.

U.S. Pat. No. 5,281,562 has been discussed in some detail above and discloses the preferred glass compositions for use in the present invention.

DESCRIPTION OF PREFERRED EMBODIMENTS

FIGS. 1–8 illustrate the heat treating parameters of the subject invention. Thus, each FIGURE records the transmittance curve of Corning Code 8010 glass lenses fired in flowing hydrogen gas at a particular temperature for a particular period of time, both the front and back surfaces of the discs being exposed to the gas. Corning Code 8010 glass has the following approximate composition, expressed in terms of weight percent, which composition is encompassed within U.S. Pat. No. 5,281,562:

| SiO$_2$ | 48.2 | BaO | 4.8 |
|---|---|---|---|
| Li$_2$O | 2.1 | ZrO$_2$ | 4.5 |
| Na$_2$O | 3.4 | CuO | 0.35 |
| K$_2$O | 5.7 | Cl | 0.49 |
| Al$_2$O$_3$ | 8.7 | Br | 0.40 |
| B$_2$O$_3$ | 20.5 | SnO$_2$ | 0.53 |

Figure 1:
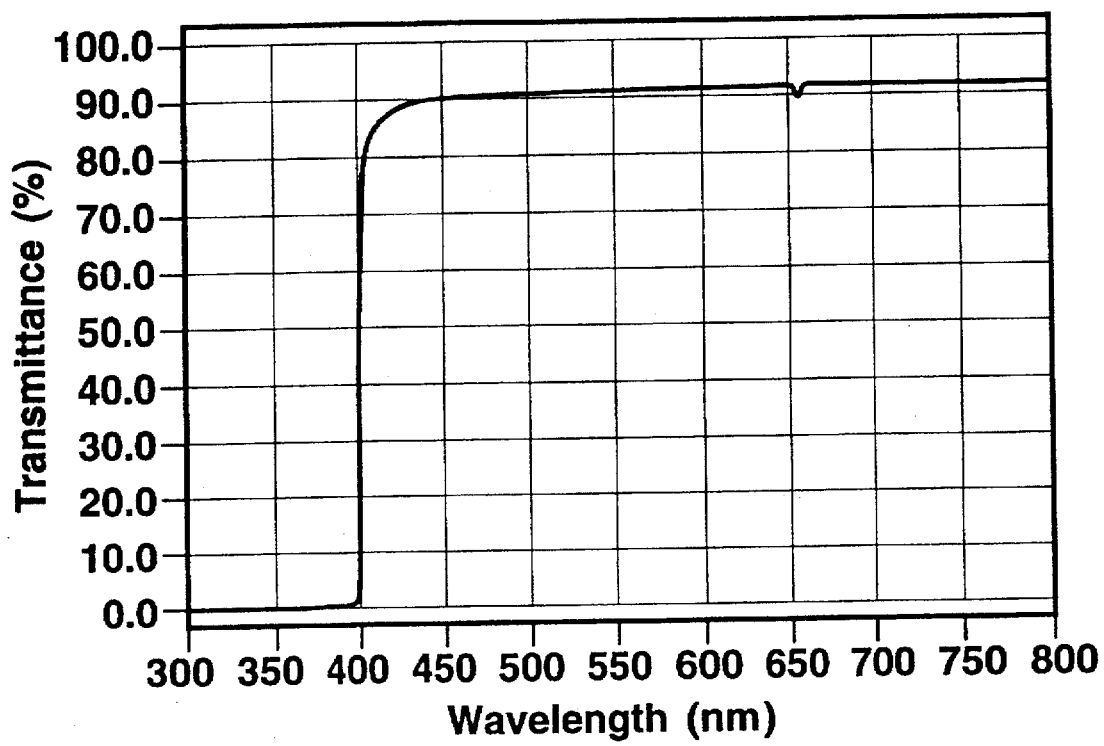

FIG. 1 records the transmittance curve exhibited by Corning Code 8010 glass before any heat treatment. As can be seen, there is a very sharp cutoff at the edge of the region of visible radiation such that the glass is essentially completely opaque to ultraviolet radiation, i.e., radiation below a wavelength of about 400 nm.

Figure 2:
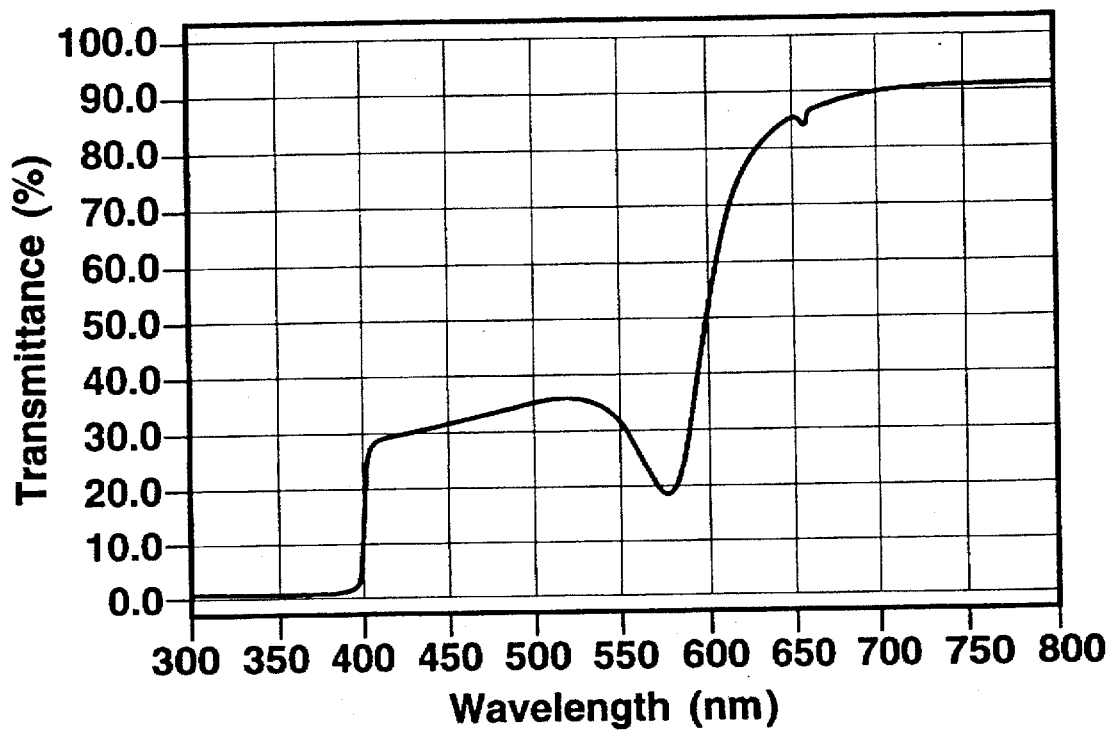

FIG. 2 comprises the transmittance curve exhibited by Corning Code 8010 glass after being fired for 185 minutes in an atmosphere of flowing hydrogen gas at a temperature of 402° C. As can be seen, that treatment was insufficient to provide essentially complete opacity above a wavelength of about 400 nm.

Figure 3:
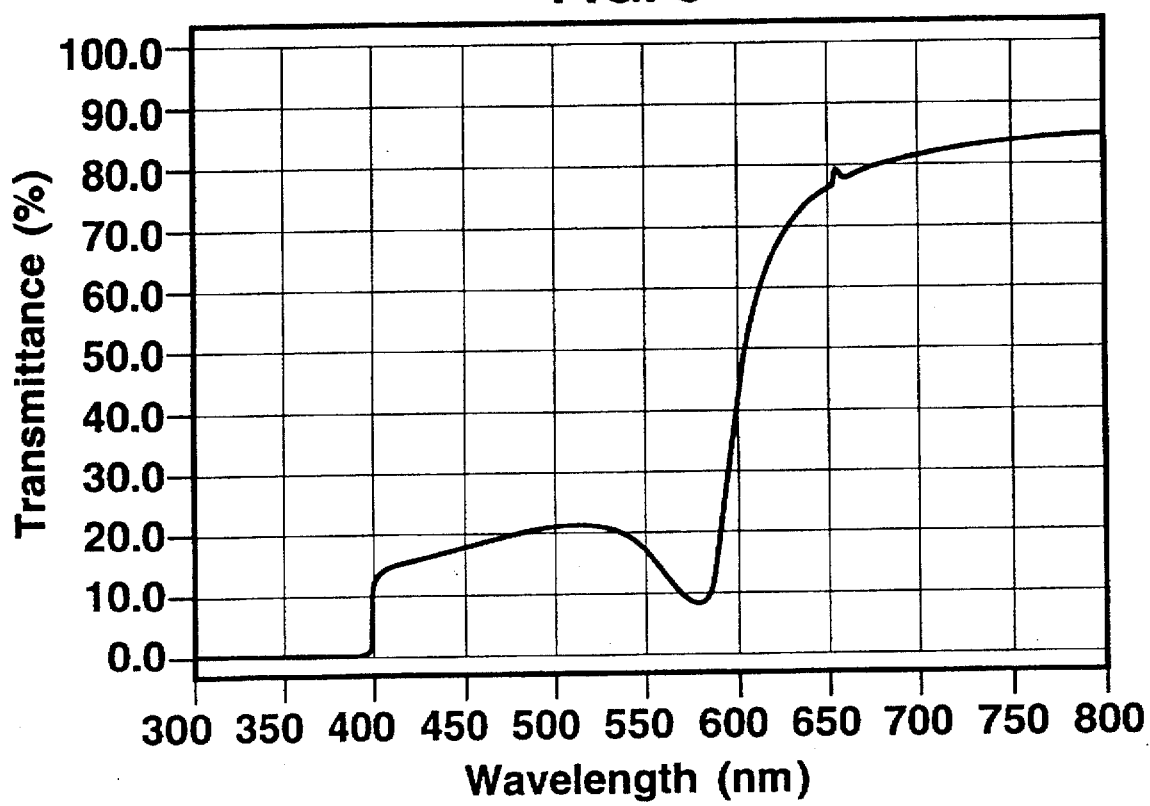

FIG. 3 reports the transmittance curve exhibited by Corning Code 8010 glass after being fired in an atmosphere of flowing hydrogen gas at a temperature of 400° C. for 8 hours. As can be seen, that treatment was again insufficient to provide essentially complete opacity above a wavelength of about 400 nm.

Figure 4:
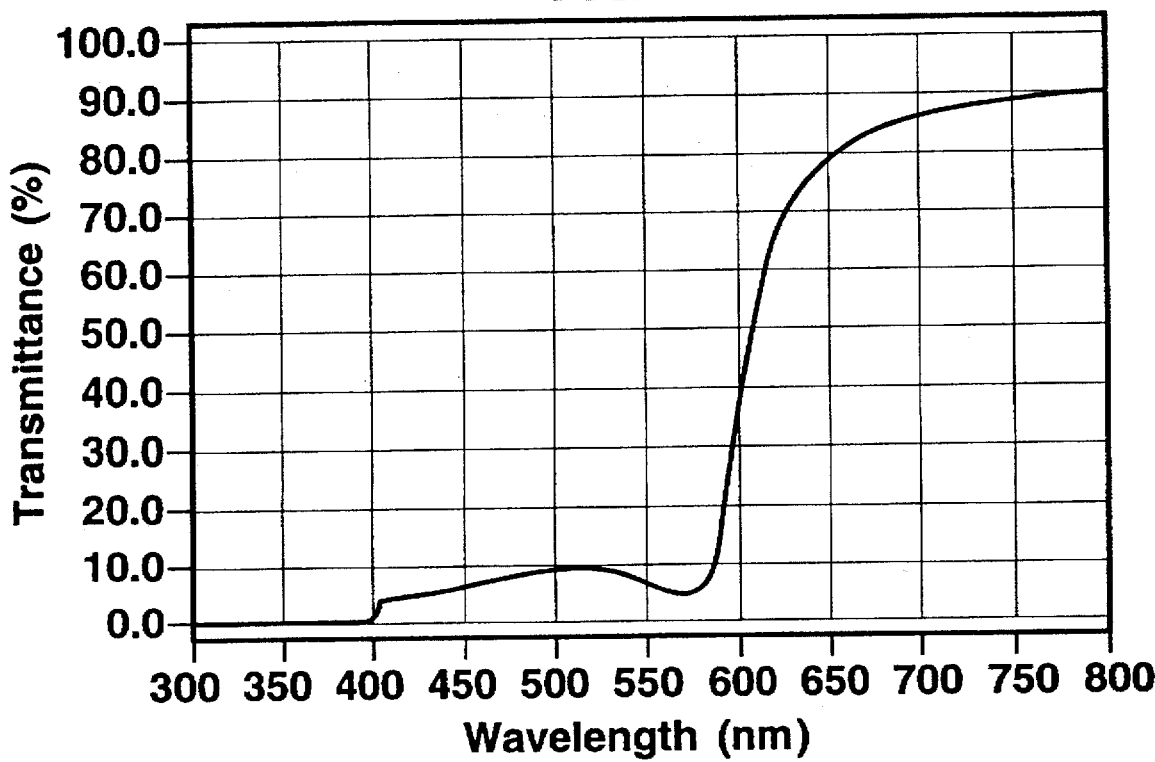

FIG. 4 depicts the transmittance curve exhibited by Corning Code 8010 glass after being fired for 20 hours in an atmosphere of flowing hydrogen gas at a temperature of 416° C. As can be seen, that treatment reduced the transmittance of the glass at wavelengths up to 550 nm to less than 10%. The use of a high temperature would have reduced the transmittance still further.

Figure 5:
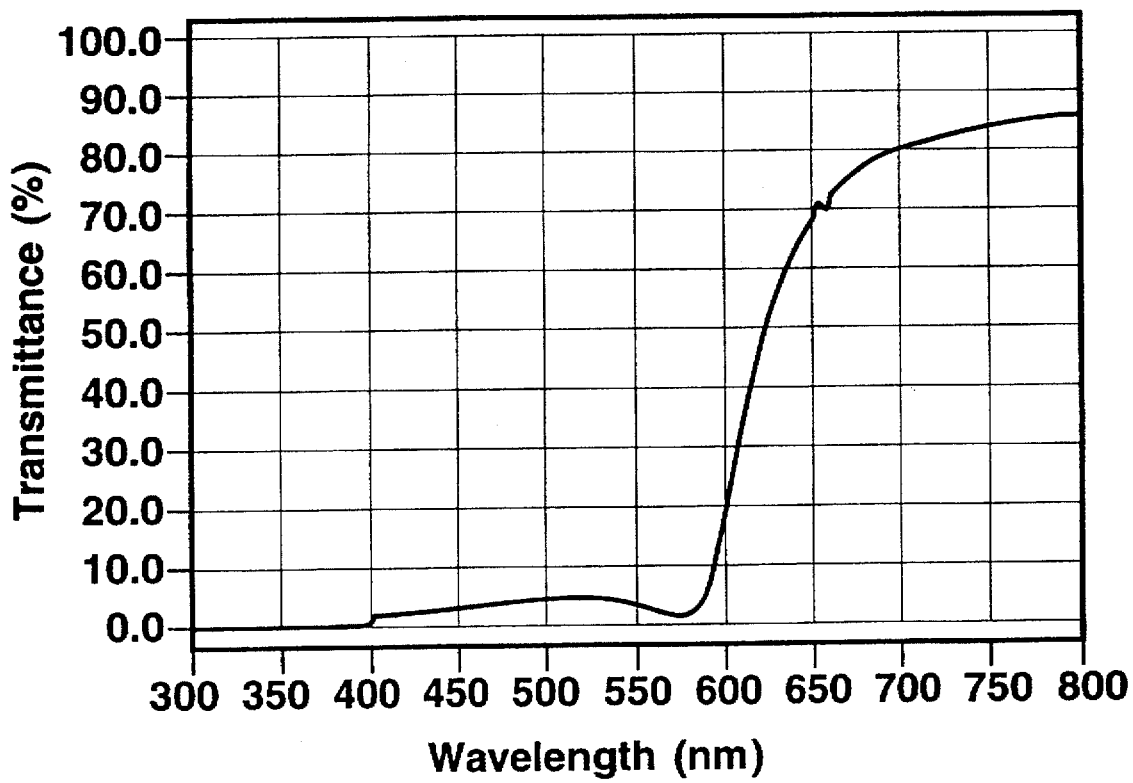

FIG. 5 comprises the transmittance curve exhibited by Corning Code 8010 glass after being fired for 40 hours in an atmosphere of flowing hydrogen gas at a temperature of 400° C. The glass was designed to provide a radiation cutoff below a wavelength of 550 nm.

From a study of the above operable and comparative examples, it can be observed that at least about 18 hours of heat treatment is required to generate a reduced surface layer of the necessary thickness to essentially completely inhibit the transmission of radiation having wavelength up to about 550 nm. Nevertheless, as noted earlier, longer exposure periods, e.g., at least 24 hours at temperature of 400°–450° C. are preferred. And, as can also be observed from that study, the rate of development of the surface layer is temperature dependent. Finally, it is believed self-evident that the exposure of a single surface of an article to the hydrogen gas atmosphere will require much more time to effect a reduced layer of sufficient depth to prevent the passage of radiation therethrough than where the front and back surfaces of the article are concurrently exposed to the hydrogen gas atmosphere.

The best mode of the invention of which we are currently aware comprises exposures of at least 24 hours at a temperature between 400°–450° C.

We claim:

1. A shield for laser radiation comprising a cuprous halide- or a cuprous-cadmium halide-containing glass body which is essentially completely opaque to ultraviolet radiation and to radiation below a given wavelength within the region of wavelengths up to 550 nm, but is transparent to visible radiation having a wavelength longer than the radiation within the region of opacity, said glass body having at least an exposed front surface having an integral reduced layer therein, the depth of that layer being sufficient to effectively prevent the transmission therethrough of radiation having wavelengths up to the given wavelength within the region of wavelengths up to 550 nm.

2. A shield for laser radiation according to claim 1 wherein said glass body has a base composition consisting essentially, expressed in terms of cation percent on the oxide basis, of 35–73% SiO$_2$, 15–45% B$_2$O$_3$, 0–12% Al$_2$O$_3$, the Al$_2$O$_3$ being less than 10% when SiO$_2$ is greater than 55%, 0–12% Li$_2$O, 0–20% Na$_2$O, 0–12% K$_2$O, 4.75–20% Li$_2$O+Na$_2$O+K$_2$O, 0–5% CaO and/or SrO and/or BaO, 0.125–1.0% Cu$_2$O, 0–1% CdO, 0–5% ZrO$_2$, 0–0.75% SnO$_2$, and 0–1% As$_2$O$_3$ and/or Sb$_2$O$_3$, and containing, expressed in terms of weight percent, 0–1.75% Cl, 0–1.0% Br, 0.25–2.0% Cl+Br, and 0–2% F, said glass having an R-value, calculated in terms of mole percent, of 0.15–0.45, the R-value not exceeding 0.30 except as the glass composition meets at least one condition selected from the group consisting of up to 12 cation % $Li_2O$, less than 10 cation % $Al_2O_3$, at least 0.3 cation % $Cu_2O$, and 0.50–2.0 weight percent Cl+Br.

3. A shield in accordance with claim 1 wherein the entire surface of said glass body has an integral reduced layer therein, the depth of that layer being sufficient to effectively prevent the transmission through the glass body of radiation having wavelengths up to the given wavelength within the region of wavelengths up to 550 nm.

4. A shield in accordance with claim 1 wherein the glass body is an eyeglass lens.

5. A shield in accordance with claim 1 wherein the glass body contains a non-photochromic cuprous halide or cuprous-cadmium halide crystal phase.

6. A shield in accordance with claim 1 wherein the glass body contains a photochromic cuprous halide or cuprous-cadmium halide crystal phase.

7. A shield in accordance with claim 1 wherein the given wavelength is 550 nm.

* * * * *